United States Patent Office 3,564,905
Patented Feb. 23, 1971

3,564,905
ULTRASONIC IMAGING TECHNIQUE
Byron B. Brenden and David R. Hoegger, Richland, Wash., assignors to Holotron Corporation, Wilmington, Del., a corporation of Delaware
Filed Mar. 6, 1968, Ser. No. 710,893
Int. Cl. G01n 29/04
U.S. Cl. 73—67.5                                        18 Claims

ABSTRACT OF THE DISCLOSURE

An ultrasonic imaging method and apparatus with substantial utility in the higher ultrasonic frequency range in which an ultrasonic hologram is produced at a liquid detecting surface by the interaction of an ultrasonic object beam and an ultrasonic reference beam produced respecively by two ultrasonic transducers positioned just below the ultrasonic detecting surface and placed one on top of the other in a manner such that the ultrasonic beam produced by the lower of the two transducers passes through the upper of the transducers on its way to the detecting surface as if the upper transducer was a window. An improved vibration isolation tank for containing a thin film liquid detector is also disclosed which minimizes the image noise resulting from vibration waves in the surface of the liquid detector.

BACKGROUND OF THE INVENTION

Field of the invention

This invention relates to the field of ultrasonic holography and more specifically relates to a method and apparatus for producing ultrasonic holograms that will render an image of improved quality and that is useful with relatively high frequency ultrasonic radiation.

Brief description of the prior art

A system and apparatus for producing ultrasonic holograms capable of rendering images of objects in visible light or other types of electromagnetic radiation has been described and claimed in copending application Ser. No. 569,914 filed Aug. 3, 1966. Although the principles of ultrasonic holography as disclosed and claimed in this patent application are applicable throughout the range of the entire compressional wave spectrum, it has been found that due to practical difficulties and because of the particular type of objects of which ultrasonic holograms are desired to be made, the range of ultrasonic frequencies capable of producing high quality ultrasonic holograms and images rendered therefrom has been limited. One of the limiting characteristics of prior ultrasonic holography techniques is that the angle between the object beam and the reference beam propagated in a liquid medium necessary to produce the ultrasonic hologram can be made only so small and the transducers producing these beams positioned only so close to the ultrasonic hologram before it is impossible to keep the object out of the reference beam but still in the object beam. In order to reduce attenuation of the object beam especially at higher ultrasonic frequencies, it is desirable to make as short as possible the path lengths between the transducer and the ultrasonic hologram. Also, as will be explained in more detail hereinafter, in order to utilize higher frequency ultrasonic radiation it is necessary to decrease the angle between the object beam and the reference beam. Thus it would be desirable to eliminate the above-mentioned limiting characteristics of present-day ultrasonic holography techniques to allow more effective use of the higher ultrasonic frequencies.

It is, therefore, a primary object of this invention to provide a technique of making ultrasonic holograms whereby the angle between the object beam and the reference beam may be minimized.

It is another object of this invention to produce a technique of making ultrasonic holograms whereby the path lengths of the ultrasonic beams are minimized.

It is a more specific object of this invention to produce a technique of making ultrasonic holograms utilizing higher frequency ultrasonic radiation.

It is still another object of this invention to produce a technique of making ultrasonic holograms whereby attenuation of the object beam is reduced.

It is also desirable, in order to reconstruct an image of high quality regardless of the ultrasonic frequency used, to minimize the noise resulting in the image. It is, therefore, a further object of this invention to provide apparatus to minimize adverse effects of vibrational waves in a liquid detecting surface.

SUMMARY OF THE INVENTION

Briefly described, the present invention comprises apparatus and methods of producing ultrasonic holograms including means for directing a first ultrasonic beam within a liquid medium through an object and then to a hologram detecting surface, means for directing a second ultrasonic beam directly to the hologram detecting surface to interfere with the first ultrasonic beam thereby producing an ultrasonic hologram, said means for directing the first ultrasonic beam being positioned such that said first beam passes through said means for directing said second ultrasonic beam to said hologram detecting surface after passing through said object whereby the object can be kept out of the reference beam while the angle between the object beam and the reference beam can be made quite small.

The present invention further includes apparatus for eliminating noise in the reconstruction of an image of the object comprising a liquid detector separated from a liquid medium and further enclosed by a vibration isolation tank with rectangular walls. The vibrations of this rectangular isolation tank create disturbances in the liquid detection surface which creates vibrational noise upon light readout that may be easily blocked by a spatial filter.

In order to understand the invention and applications in its preferred embodiments, the following description is presented which should be taken in conjunction with the drawings.

DESCRIPTION OF THE PREFERRED EMBODIMENTS

Figure 1:
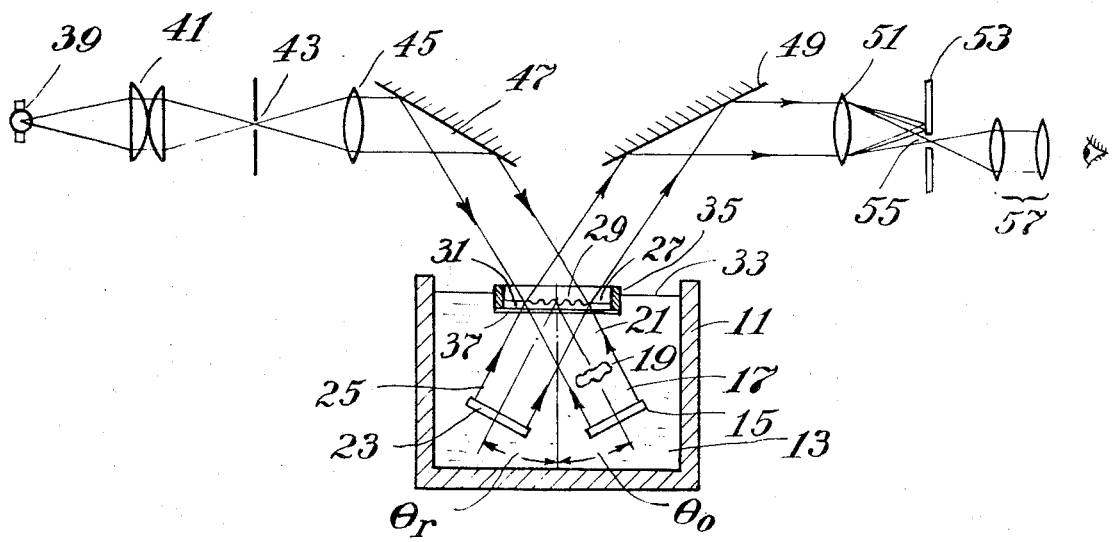
FIG. 1 is a diagrammatical representation of the present means and method for producing an ultrasonic hologram.

Since the present invention is an improvement upon present techniques of ultrasonic holography, a basic ultrasonic holographic system will first be described, with reference to FIG. 1. A tank 11 contains an ultrasonic transmitting fluid medium 13 which is preferably a liquid such as water. An ultrasonic transducer 15 generates an ultrasonic beam 17 which is directed through an object 19 under investigation which results in an object modulated ultrasonic beam 21. An ultrasonic transducer 23 generates at substantially the same frequency (i.e., mutually coherent with the beam 17) an ultrasonic reference beam 25 which is directed in a direction to interfere with object beam 21 at a detecting surface 27, whereby a standing wave 29 is created which carries image information pertaining to the object 19 under examination. The detecting surface may be any interface between two fluids of substantially different densities, and is shown here as a liquid 31 with an interface 2 bonded by air. The top surface 33 of the liquid medium 13 may also be utilized as the detecting surface by removing the isolation tank 35 from the liquid 13. However, the tank 35 improves the quality of the resulting interference pattern by isolating a small detector surface from the remainder of the liquid medium surface 33. The detecting surface 27 remains free from the effects of disturbances in the liquid surface 33. Also, the thin film liquid detector 31 may be chosen for appropriate surface qualities to produce a quality standing wave hologram 29 while the liquid medium 13 may be chosen for its properties of transmitting ultrasound, cooling the transducers submersed therein, and for its compatibility with the object under investigation. The thin film liquid detector 31 is held in place and separated from the liquid 13 by a thin film 37 which is transparent to ultrasound. Further variations of usable isolation tanks and detecting surfaces may be found described in the aforementioned copending application S.N. 569,914, and also in copending application S.N. 613,511 filed Feb. 2, 1967, and now abandoned and in copending application S.N. 614,711 filed Feb. 8, 1967, and now abandoned.

The image information contained in the standing wave hologram 29 pertaining to the object 19 under investigation is read visually as shown in FIG. 1. A point source of light is necessary and many be obtained from a super pressure mercury lamp 39 using the condenser lenses 41 to focus light on a pin hole 43. A source of light having a higher degree of coherence than a mercury lamp, such as a laser, may alternately be employed. Light passes through the pin hole 43 and then through a lens 45 and reflected by a mirror 47. The light reflected from the standing wave hologram 29 is further reflected by a mirror 49 through a lens 51. A spatial filter 53 is placed at the focal plane of lens 51 and blocks out all but one first order beam 55, which is diffracted from the hologram 29. Lenses 57 comprise an optical system which allows viewing an image of the object 19 carried by a first order diffracted beam 55. As an alternative to focusing the lenses 57 directly upon an object image, the lenses 57 may be focused on the hologram 29 for improved image resolution in many circumstances, as disclosed and claimed in a copending application by Byron B. Brenden entitled "Improved Imaging Technique for Ultrasonic Holography," filed concurrently with the present application and assigned Ser. No. 710,991, and now abandoned. The advantage of an ultrasonic holographic system as described with respect to FIG. 1 is that the object 19 may be viewed in real time. Also, a permanent hologram on photographic film may be made of hologram 29 for later viewing of the image, if desired.

It is to be understood that this system of imaging may be performed with a wide range of frequencies of compressional energy in the beams 17 and 21, but it has been found that superior results are obtained when compressional energy in the ultrasonic frequency range is utilized. Therefore, the words "ultrasound" or "ultrasonic wave" are utilized throughout this specification but are not intended to limit the scope of the invention to this specific frequency range of compressional wave energy.

For examination of certain objects, it is desirable to use ultrasonic energy in a very high frequency range. It is desirable to make certain modifications in the configuration of FIG. 1 for ultrasonic frequencies around 20 megahertz and above in order to maintain a standing wave hologram capable of rendering an image of high brightness. At any ultrasonic frequency, the angle that the reference beam 25 makes with the perpendicular to the detecting surface 27, $\theta_r$ is preferably equal and opposite to the angle that the object beam 21 makes with the perpendicular to the detecting surface 27, $\theta_0$, for many ultrasonic imaging situations. For an ultrasonic standing wave hologram 29 that will produce an image of object 19 with sufficient brightness for easy observation, the range of angles $\theta_r$ and $\theta_0$ which may be used is limited and further is dependent upon the frequency of the ultrasound being utilized. As the frequency increases, the angles $\theta_r$ and $\theta_0$ should become smaller to maintain a bright image. Furthermore, as the frequency increases, the attenuation of the ultrasonic beams by liquid 13 becomes greater so that it is desired to place the ultrasonic transducers 15 and 23 as close to the detecting surface 27 as possible. It can be readily seen that as these two adjustments are made in the basic configuration shown in FIG. 1, it becomes difficult to keep the object 19 out of the reference beam 25 while it remains in the path of the object beam 17. For a standing wave hologram 29 of high quality, therefore, it is desirable to seek a new method and apparatus for constructing a standing wave hologram with ultrasonic energy of a very high frequency.

Figure 2:
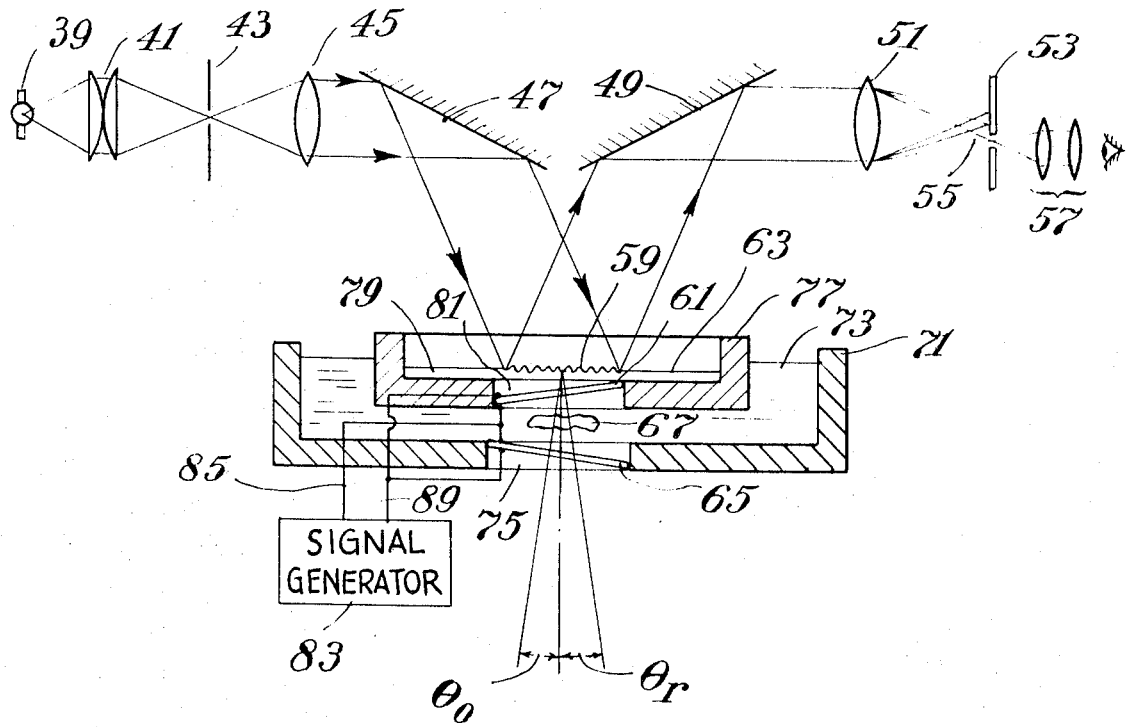
FIG. 2 is a diagrammatical representation of an embodiment of the present invention.

An improved configuration is shown in FIG. 2, wherein the optical system for reading out information from a standing wave hologram 59 is the same as previously described with reference to FIG. 1. To create a standing wave hologram 59, a thin transducer 61 generates a first (reference) ultrasonic beam and directs it at an angle of $\theta_r$ with a perpendicular to the detecting surface 63. A second (object) beam is generated by an ultrasonic transducer 65 and is directed to pass through the object 67 wherein the beam is modulated with information about the object 67, and then passes through the transducer 61 without significant change in its characteristics, and forming an angle $\theta_0$ with a perpendicular to the liquid detecting surface 63. As a result of this configuration, $\theta_0$ and $\theta_r$ can be made as small as desired and, further, the distances between the object 67 and the detecting surface 63 are made shorter than in the configuration of FIG. 1, thereby reducing attenuation of the ultrasonic beams before interference at the detecting surface which is advantageous for ultrasonic holography at any frequency but especially so at the higher frequencies.

It has also been found that another important advantage results from placing the transducer very close to the hologram surface in accordance with this invention, and that this results in a reference beam having an improved quality. The cleaner reference beam reduces noise in images reconstructed from these holograms. Furthermore, placing the object closer to the detecting surface improves the image resolution when the viewing optical system 57 is focused on an image of the hologram surface instead of on an object image according to the aforementioned concurrently filed application by Byron B. Brenden.

A preferred apparatus which utilizes this novel configuration of ultrasonic imaging elements is shown in FIG. 2. A tank 71 holds an ultrasonic transmitting medium 73. The tank 71 has an opening 75 in its bottom which is utilized to support the object beam transducer 65, which is positioned within opening 75 at the desired angle and with a liquid-tight seal. An isolation tank 77 is used to hold a thin film detecting liquid 79 which has a capacity for forming a quality standing wave hologram 59 at its surface 63. The isolation tank 77 further serves to give support to the reference beam transducer 61 which is fastened in a liquid-tight manner into the opening 81.

The preferred material for the ultrasonic transducers 61 and 65 is thin quartz crystal sheet which may be excited by application of an electrical current with a frequency equal to that of the natural frequency of the crystal as cut for this application. Since the ultrasonic transducer 61 is cut to have a natural frequency equal to that generated by the ultrasonic transducer 65, the transducer 61 will appear transparent to the object beam produced by the transducer 65 for a small angle $\theta_0 + \theta_r$ of approximately ten degrees or less. An electronic signal generator 83 is utilized for causing the crystal transducers 61 and 65 to oscillate, being interconnected by the wires 85 and 89. It is normally desirable to arrange this connection so that conductor 85 is connected to the bottom surface of the ultrasonic transducer 61 and also to the top surface of the ultrasonic transducer 65 to eliminate any voltage difference between them. The two liquids 79 and 73 should be insulated from each other to avoid shorting the connections across the crystal ultrasonic transducers.

Figure 3A:
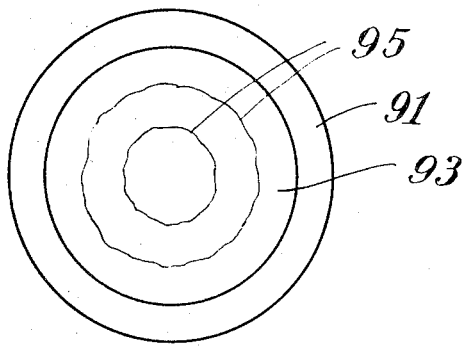
FIG. 3A shows the top view of an apparatus for detecting the interference of two ultrasonic waves as presently used.
Figure 4A:
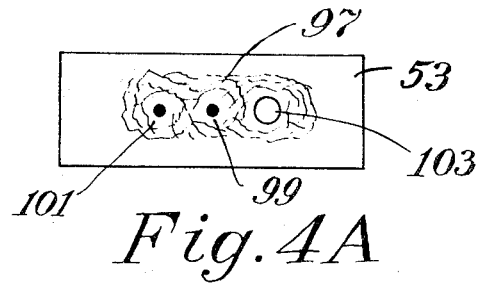
FIG. 4A shows a light distribution at the spatial filter which is obtained when the detector apparatus of FIG. 3A is used.

To further improve the quality of the standing wave hologram 59, an alteration has been made in the shape and construction of the isolation tank 77. Referring to FIG. 3A, the top view of the isolation tank is represented where the wall 91 of the tank corresponds to the wall 77 shown in cross section in FIG. 2, or to the wall 35 shown in FIG. 1. A frame 91 encloses a thin liquid film 93 which is utilized as the ultrasonic detector. Although such an isolation tank prevents disturbances on the surface of the detector 93 from disturbances in the ultrasonic beam transmitting liquid 33 of FIG. 1 or liquid 73 of FIG. 2, the frame 91 may itself cause disturbances in the detecting surface 93. Frame 91 is preferably secured to the overall apparatus support in order to keep it leveled. This connection can carry vibrations to the tank through frame 91 which will induce disturbances in surface 93, such as the wave fronts 95 as shown in FIG. 3A. These disturbances can be caused by building vibrations, air currents, or strong disturbances in the surrounding liquid medium which causes frame 91 to vibrate. Such disturbances cause noise in the visual signal read-out from the hologram made on the liquid surface 93 which detracts from the image information of the object under investigation. FIG. 4A shows a result of this noise at the spatial filter 53, exhibiting itself in a manner as shown where lines 97 represent a random pattern of light. This visual noise appears, as is shown, over a wide spatial frequency spectrum including the zero order and both first order diffracted beams.

Figure 3B:
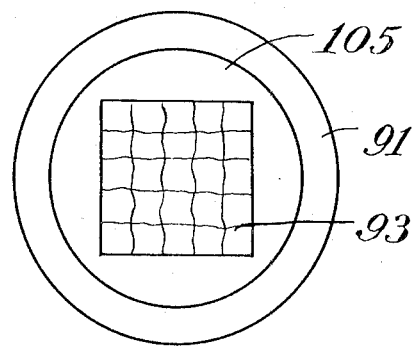
FIG. 3B shows a top view of an apparatus for detecting the interference of two ultrasonic beams according to the present invention.
Figure 4B:
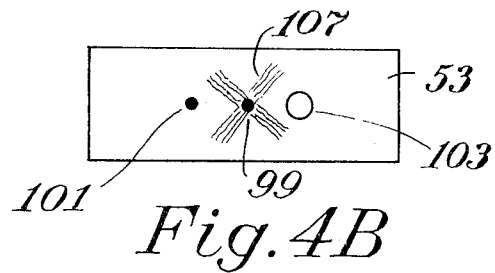
FIG. 4B shows the light distribution at the spatial filter when the detector apparatus of FIG. 3B is used.

Referring to FIG. 3B, it has been discovered that this noise may be filtered out of the desired signal information if the inside walls of the isolation tank are rectangular, as is provided by an insert 105. Any vibration of the isolation tank frame 91 will cause disturbances in the thin film ultrasonic detector 93 to be approximately parallel to the side walls of the insert 105. With this configuration, the visual noise is in the form of an "X" 107 on the spatial filter 53, as shown in FIG. 4B, which avoids both first order diffracted beams. The spatial filter 53 will block noise 107 from interference with the first order diffracted beam carrying the desired visual information which passes through opening 103. By rotating the insert 105 of FIG. 3B in the plane of the paper, the noise 107 of FIG. 4B will rotate around the zero order diffracted beam 99 on spatial filter 53, and provision is made for such rotation in order to allow an adjustment for minimizing the noise in the desired signal.

It should also be noted that although a rectangular shaped opening in insert 105 has been shown as a preferred embodiment, other shapes are possible without deviating from the present invention. The primary requirement for such an insert opening is that the inside walls form straight lines of finite length. The noise is then predictable and may be filtered at the focal plane of the lens 51 by use of a spatial filter for a varied range of geometrical shapes.

As hereinabove described, thin liquid film 31 in FIG. 1 and liquid 79 in FIG. 2 are chosen for their stability against vibration and for the ability of their surfaces to deform when irradiated with ultrasound. Thin film liquid 31 and 79 may be water, one of several commercially available fluorocarbon liquids, mineral oil, or one of many silicone oils available, as examples. A useful viscosity range for the liquid chosen is 1–10 centipoises and the preferred viscosity is approximately 5 centipoises. One of the most useful liquids for this purpose has been found to be Freon E5, a Du Pont product. Furthermore, the thin film liquid 31 and 79 is preferably of uniform thickness for best imaging results.

The thin isolation film 37 of FIG. 1 may be any thin, homogeneous, plastic or metal sheet material which is transparent to ultrasound. Suitable sheet materials include polyethylene film (300 gauge), polyethylene terephthalate film (0.001 inch thick) and polyvinyl chloride film (200–400 gauge). The film should preferably have a dull black finish. In any ultrasonic imaging arrangement, light must be reflected from the surface 27 of the thin film liquid detector 31. Any light reflected from the surfaces of the isolation film 37 will reduce the contrast in the resulting image.

It shall be understood that the invention is not limited to the specific arrangements shown, and that changes and modifications may be made within the scope of the appended claims.

What is claimed is:

1. A method for making an ultrasonic hologram, comprising the steps of:
    directing a first beam of ultrasonic energy to a hologram detecting surface from a transducer; and
    simultaneously directing a second beam of ultrasonic energy mutually coherent with said first beam through an object under investigation and thence through said transducer to intersect said first beam of ultrasonic energy at a finite angle for interference therewith at said hologram detecting surface, thereby generating at said detecting surface an ultrasonic hologram.

2. The method of claim 1 wherein said first and second beams of ultrasonic energy are directed to said hologram detecting surface at substantially equal but opposite angles respectively with respect to a normal to said hologram detecting surface.

3. The method of claim 1 wherein said first and second beams of ultrasonic energy are of a frequency in excess of 20 megahertz.

4. Apparatus for producing ultrasonic holograms comprising,
    means for generating a first beam of ultrasonic energy for passage through an object onto a hologram detecting surface responsive to ultrasonic energy, and
    means for generating a second beam of ultrasonic energy to intersect said first beam of ultrasonic energy at a finite angle therewith at said hologram detecting surface, said second beam being mutually coherent with said first beam, thereby generating an interference pattern on said detecting surface in the form of an ultrasonic hologram, said means for generating said first beam of ultrasonic energy being positioned to direct said first beam through said means for generating said second beam of ultrasonic energy after said first beam passes through the object.

5. Apparatus according to claim 4 wherein said means for generating said first and second beams of ultrasonic energy comprises first and second ultrasonic transducers respectively.

6. Apparatus according to claim 5 wherein said first and said second ultrasonic transducers comprise electrically driven thin quartz plates.

7. Apparatus according to claim 5 wherein said ultrasonic transducers are driven to generate said first and said second beams of ultrasonic energy at ultrasonic frequencies greater than 20 megahertz.

8. Apparatus according to claim 7 wherein said first and second beams of ultrasonic energy are directed to said hologram detecting surface at substantially equal but opposite angles respectively with respect to a normal to said hologram detecting surface.

9. Apparatus for producing an image of an object comprising the elements of claim 4 in combination with a means for reflecting light from said ultrasonic hologram, thereby producing a diffracted order of said light which reconstructs an image of an object.

10. Apparatus according to claim 4 wherein said detecting surface includes a thin layer of liquid material bounded by a frame and positioned at a location of the interference of said first and second beams, said liquid material being distortable by the energy of said two interfering ultrasonic beams.

11. Apparatus according to claim 10 wherein said frame contains said liquid material in an area bounded by a plurality of straight lines of finite length.

12. Apparatus according to claim 10 wherein said frame contains said liquid material in a rectangular shaped area.

13. An arrangement for producing an optical image of an object illuminated by ultrasonic energy comprising,
means for directing a beam of ultrasonic energy to said object and thence as an object modified beam to a hologram detector,
means for directing a reference beam of ultrasonic energy to said hologram detector to intersect said object modified beam at a finite angle therewith, said reference beam mutually coherent with said object illuminating beam, thereby to generate an ultrasonic energy interference pattern across said hologram detector,
said hologram detector including a frame having a plurality of straight sides of finite length enclosing a thin film of liquid material positioned coincident with said ultrasonic energy interference pattern, whereby said ultrasonic interference pattern generates a standing wave pattern on a surface of said thin film of liquid,
means including a point source of light for illuminating said standing wave pattern in a manner to produce at least one first order diffracted object image carrying beam as well as other light orders, and
means for blocking said other light orders while allowing said at least one first order diffracted beam to pass, thereby isolating said at least one first order diffracted beam so that an image of said object may be viewed therein.

14. Apparatus according to claim 13 wherein said hologram detector additionally includes thin sheet material which carries said thin film of liquid and through which the ultrasonic energy beams pass.

15. Apparatus according to claim 14 wherein said frame is rotatable with respect to said intersecting beams.

16. Apparatus according to claim 13 wherein said frame encloses the liquid material by four straight sides.

17. Apparatus according to claim 13 wherein said frame is rectangular in shape.

18. Apparatus according to claim 13 wherein said blocking means includes an opaque spatial filter positioned with an aperture thereof passing said at least one first order diffracted beam, and wherein at least one of the straight sides of said hologram detector frame is oriented with respect to said intersecting beams in a manner that ripples in the liquid film which are parallel to said at least one straight side causes optical noise to be spatially located for blocking by the opaque portion of said spatial filter.

References Cited

UNITED STATES PATENTS

| 2,832,214 | 4/1958 | Trommler | 73—67.6 |
| 3,400,363 | 9/1968 | Silverman | 340—3 |

OTHER REFERENCES

Mueller et al., Sound Holograms and Optical Reconstructions, Applied Physics Letters, Nov. 1, 1966, pp. 328–329.

RICHARD C. QUEISSER, Primary Examiner

J. P. BEAUCHAMP, Assistant Examiner

U.S. Cl. X.R.

350—3.5

UNITED STATES PATENT OFFICE
CERTIFICATE OF CORRECTION

Patent No. 3,564,905　　　　　　　　Dated Feb. 23, 1971

Inventor(s) Byron B. Brenden and David R. Hoegger

It is certified that error appears in the above-identified pat and that said Letters Patent are hereby corrected as shown below:

Column 1, lines 16 & 17, correct the spelling of "respectively".

Column 3, line 14, change "2 bonded" to --27 bounded--.

Signed and sealed this 20th day of November 1973.

(SEAL)
Attest:

EDWARD M. FLETCHER, JR.　　　　　RENE D. TEGTMEYER
Attesting Officer　　　　　　　　　Acting Commissioner of Patents